United States Patent
Hsueh et al.

(10) Patent No.: US 8,176,226 B2
(45) Date of Patent: *May 8, 2012

(54) KVMP SWITCH ALLOWING ASYNCHRONOUS AND SYNCHRONOUS SWITCHING FOR CONSOLE DEVICES AND PERIPHERAL DEVICES AMONG DIFFERENT COMPUTERS

(75) Inventors: Chao-Hsuan Hsueh, Taipei (TW); Yunghsun Huang, Taipei (TW); Sun-Chung Chen, Taipei (TW); Sampson Yang, Irvine, CA (US)

(73) Assignee: ATEN International Co., Ltd., Shijr (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/329,350

(22) Filed: Dec. 5, 2008

(65) Prior Publication Data

US 2009/0083453 A1 Mar. 26, 2009

Related U.S. Application Data

(63) Continuation-in-part of application No. 11/727,333, filed on Mar. 26, 2007, now Pat. No. 7,472,217, which is a continuation of application No. 11/204,036, filed on Aug. 16, 2005, now Pat. No. 7,340,556, which is a continuation of application No. 10/065,375, filed on Oct. 10, 2002, now Pat. No. 6,957,287.

(60) Provisional application No. 60/338,071, filed on Nov. 9, 2001.

(51) Int. Cl.
*G06F 13/12* (2006.01)

(52) U.S. Cl. ............................... 710/72; 710/10; 710/16

(58) Field of Classification Search .......... 710/306–317, 710/62–64, 72–73, 8–19; 709/227–232
See application file for complete search history.

(56) References Cited

U.S. PATENT DOCUMENTS 4,866,667 A   9/1989  Shimada
(Continued)

FOREIGN PATENT DOCUMENTS

CN   1310402 A   8/2001
(Continued)

OTHER PUBLICATIONS

Petition for invalidation of TW Patent No. 589539, submitted to the Taiwan Intellectual Property Office by Tangtop Technology, Mar. 2, 2006 and Mar. 31, 2006 (18 pages).

(Continued)

*Primary Examiner* — Raymond Phan
(74) *Attorney, Agent, or Firm* — Chen Yoshimura LLP

(57) ABSTRACT

A signal switch for sharing a video monitor, a plurality of console devices compliant with an industry standard and one or more than one peripheral device in any of a plurality of computer systems, is provided. A KVM switch allows all the computers connected to the switch to share any USB peripheral devices, and which can switch the KVM channels and peripheral channels to a common computer or to different computers either asynchronously or synchronously without interruption of data flow to that peripheral when the switch is changed. In another embodiment the KVM switch allows a keyboard and a mouse of a user console to separately control two different computers. In another embodiment, the KVM switch is connected to the computers via computer connection modules and connected to a user console and peripheral devices via a console connection module.

23 Claims, 7 Drawing Sheets

U.S. PATENT DOCUMENTS

| | | | |
|---|---|---|---|
| 5,581,709 A | 12/1996 | Ito et al. | |
| 5,638,521 A | 6/1997 | Buchala et al. | |
| 5,721,842 A | 2/1998 | Beasley et al. | |
| 5,732,212 A | 3/1998 | Perholtz et al. | |
| 5,754,881 A | 5/1998 | Aas | |
| 5,841,424 A | 11/1998 | Kikinis | |
| 5,884,096 A | 3/1999 | Beasley et al. | |
| 5,982,614 A | 11/1999 | Reid | |
| 6,035,345 A | 3/2000 | Lee | |
| 6,073,188 A | 6/2000 | Fleming | |
| 6,105,143 A | 8/2000 | Kim | |
| 6,131,135 A | 10/2000 | Abramson et al. | |
| 6,141,704 A | 10/2000 | Huang | |
| 6,141,719 A | 10/2000 | Rafferty et al. | |
| 6,185,643 B1 | 2/2001 | Kirshtein et al. | |
| 6,192,423 B1 | 2/2001 | Graf | |
| 6,240,472 B1 | 5/2001 | Hu | |
| 6,256,014 B1 | 7/2001 | Thomas et al. | |
| 6,263,374 B1 | 7/2001 | Olnowich et al. | |
| 6,263,392 B1 | 7/2001 | McCauley | |
| 6,295,570 B1 | 9/2001 | Clemens et al. | |
| 6,304,895 B1 | 10/2001 | Schneider et al. | |
| 6,308,239 B1 | 10/2001 | Osakada et al. | |
| 6,314,479 B1 | 11/2001 | Frederick et al. | |
| 6,324,605 B1 | 11/2001 | Rafferty et al. | |
| 6,329,616 B1 | 12/2001 | Lee | |
| 6,373,500 B1 | 4/2002 | Daniels | |
| 6,378,009 B1 | 4/2002 | Pinkston, II et al. | |
| 6,388,658 B1 * | 5/2002 | Ahern et al. | 345/168 |
| 6,498,890 B1 | 12/2002 | Kimminau | |
| 6,532,512 B1 | 3/2003 | Torii et al. | |
| 6,549,966 B1 | 4/2003 | Dickens et al. | |
| 6,557,170 B1 | 4/2003 | Wilder et al. | |
| 6,567,839 B1 | 5/2003 | Borkenhagen et al. | |
| 6,578,089 B1 | 6/2003 | Simpson et al. | |
| 6,600,739 B1 | 7/2003 | Evans et al. | |
| 6,615,272 B1 | 9/2003 | Ambrose | |
| 6,633,905 B1 | 10/2003 | Anderson et al. | |
| 6,671,756 B1 | 12/2003 | Thomas et al. | |
| 6,681,250 B1 * | 1/2004 | Thomas et al. | 709/226 |
| 6,697,905 B1 | 2/2004 | Bealkowski | |
| 6,715,010 B2 | 3/2004 | Kumata | |
| 6,901,455 B2 | 5/2005 | Gough | |
| 6,957,287 B2 | 10/2005 | Lou et al. | |
| 7,035,112 B2 | 4/2006 | Chen | |
| 7,047,331 B2 | 5/2006 | Dickens | |
| 7,102,691 B2 | 9/2006 | Dischert et al. | |
| 7,330,919 B2 | 2/2008 | Zhang et al. | |
| 7,542,299 B2 | 6/2009 | Chen | |
| 7,613,854 B2 | 11/2009 | Chen | |
| 2001/0023141 A1 | 9/2001 | Chang | |
| 2001/0053627 A1 | 12/2001 | Armistead et al. | |
| 2002/0091850 A1 | 7/2002 | Perholtz et al. | |
| 2003/0005186 A1 | 1/2003 | Gough | |
| 2003/0030660 A1 | 2/2003 | Dischert et al. | |
| 2004/0001323 A1 | 1/2004 | Chen | |
| 2005/0275641 A1 | 12/2005 | Franz | |
| 2006/0253639 A1 | 11/2006 | Lee et al. | |

FOREIGN PATENT DOCUMENTS

| | | |
|---|---|---|
| GB | 2 350 212 A | 11/2000 |
| GB | 2350212 A | 11/2000 |
| GB | 2352540 A | 1/2001 |
| JP | S63-293628 A | 11/1988 |
| JP | 02-148157 A | 6/1990 |
| JP | H06-332836 A | 12/1994 |
| JP | 7-58457 | 3/1995 |
| JP | H07-104901 A | 4/1995 |
| JP | 9-55515 | 2/1997 |
| JP | 10-187303 A | 7/1998 |
| JP | 11-085338 A | 3/1999 |
| JP | 2000-196648 A | 7/2000 |
| JP | 2000-242377 A | 9/2000 |
| JP | 2000-255047 A | 9/2000 |
| JP | 2000-0073385 | 12/2000 |
| JP | 2001-043178 A | 2/2001 |
| JP | 2001051939 A | 2/2001 |
| JP | 2001-229119 A | 8/2001 |
| JP | 2001-256172 A | 9/2001 |
| JP | 2001-282701 A | 10/2001 |
| TW | 323833 | 12/1997 |
| TW | 386215 | 3/1998 |
| TW | 372289 | 10/1999 |
| TW | 406241 B | 9/2000 |
| TW | 459193 B | 10/2001 |
| TW | 459197 B | 10/2001 |
| WO | 00-68813 | 11/2000 |
| WO | 00/68813 A1 | 11/2000 |

OTHER PUBLICATIONS

EMC Test Report of certain USB KVM Switch manufactured by Tangtop Technology Co., Ltd. (Report No. E900581), by PEP Testing Laboratory, Oct. 29, 2001.

Petition for invalidation of TW Patent No. 589539, submitted to the Taiwan Intellectual Property Office by Mr. Jiang Cong-Shiu, Jun. 6, 2006. (28 pages).

Custom declaration forms and invoices, dated from Apr. 3, 2001 to Nov. 2001. (7 pages).

Computer printouts regarding sales of Shu-chan's USB Console, date unknown. (8 pages).

Universal Serial Bus Console Owner's Manual, Topshine Electronics Corp., 2000.

Universal Serial Bus (USB), Version 1.11.

Office Action by the Japanese Patent Office (JPO) in the counterpart Japanese application No. JP2007-052277, Feb. 18, 2008.

Brief submitted to the Taiwan Intellectual Property Office by a third party in an invalidity proceeding against Taiwan Patent No. 589539, dated Apr. 25, 2005.

International Search Report and Written Opinion in counterpart PCT application No. PCT/US2007/067716, dated Aug. 29, 2008.

OmniView™ 4-Port USB KVM Switch User Guide (F1D104-USB), BELKIN, 2000.

Press Release, New Power Reach Mini Elite KVM for Home and SOHO Users, Addlogix Inc., Sep. 13, 2000.

Four Ports USB KVM Switch User's Manual (source and date not specified).

USB Monitor Control Class Specification, USB Implementers Forum, Jan. 5, 1998.

USB IEEE 1994 Solutions from Good Way—KVM Switch, Asian Sources Computer Products, Mar. 2001.

Data Communication, Coming Products—MasterView, ATEN International Co., Ltd., 2000.

Master View USB Switch CS-102U User's Manual, ATEN International Co., Ltd., 1999.

Master View USB Switch CS-104U User's Manual, ATEN International Co., Ltd., 1999.

Third party's fourth supplemental brief in Taiwan invalidity proceeding TW 91123858N03, Dec. 7, 2009.

Third party's supplemental brief in Taiwan invalidity proceeding TW 91123858N03, Mar. 21, 2008.

Third party's second supplemental brief in Taiwan invalidity proceeding TW 91123858N03, Jun. 30, 2009.

Third party's third supplemental brief in Taiwan invalidity proceeding TW 91123858N03, Jul. 13, 2009.

Third party's brief in Taiwan invalidity proceeding No. TW 91123858N04, Oct. 1, 2007.

Third party's supplemental material in Taiwan invalidity proceeding No. TW 91123858N04, Feb. 21, 2008.

ATEN's User's Manual for Master View CS-142 2 port KVM Switch (1999).

ATEN User Manual for Master View CS-1004, CS-1008, CS-1016 KVM Switches (2000).

ATEN User Manual for Master View Pro CS-228 2 Console/8 Computer KVM Switch (2000).

Linksys User Guide for ProConnect Series Compact KVM Switches (1999).

StarTech.com Instruction Guide for SV211K KVM Switch (2001).

Avocent Outlook ES Series Installer/User Guide for models 140ES 180ES 280ES 1160ES 2160ES 4160ES (2001).

Cybex Commander Autoview KVM Switch and Installer/User Guide (1999).
Notification by Taiwan Intellectual Property Office regarding a charge of invalidity by third party in TW Application No. 091123858N01, to invite the applicant to submit claim amendments or rebuttals, issued Aug. 18, 2008.
Decision by Taiwan Taoyuan Civil Court in case No. 94-IP-15, *ATEN International Co., Ltd* v. *Emine Technology Company , Ltd.*, issued Jan. 10, 2011.
USB Device Class Definition for Human Interface Devices (HID) Specification, 2001.
User's Guide of USB Console for 4 Devices, undated.
"Computer Products" magazine advertising material which revealed UH800 products, Mar. 2001.
Photo of USB Console for 4 Devices, made by Topshine Electronics Corp, undated.
Document submitted as evidence by defendant in Case No. 94-IP-15, which is a compilation of materials purporting to establish the date of the USB Console product (referred to as UH800) made by Topshine Electronics Corp., undated.
Press Release—New Power Reach Mini Elite KVM for Home and SOHO Users, regarding (P/N KVM-201PRME-OSD and KVM-401PRME-OSD), Sep. 13, 2000.
Connect-Tek, KEYPORT Millennia Series, User Manual (1999).
Data Sheet, Altera® Verilog HDL: 16x16 Crosspoint Switch, © 1995-2010 [online] [retrieved on Apr. 18, 2011] Retrieved from the Altera website at http://www.altera.com/support/examples/verilog/ver_16x16.html.
Rextron MAV-108 [online] [retrieved on Apr. 6, 2011] Retrieved from Beijing Bottom Times Network Equipment Co., Ltd. website at http://www.bottomnt.com/kvm/mav108.htm.
Connect-TEK, Inc., "Keyport Millenia Series User Manual", unknown date, Long Island City, NY.
Beijing Bottom Times Network Equipment Co. Ltd., "Model MAV108", "http://www.bottomnt.com/kvrm/mav108.htm", 1 page, printed from the internet on Apr. 6, 2011.
European Search Report in counterpart application EP 06020819.6, dated Mar. 16, 2011.
"Good Way to Connect You", "Computer Products" magazine advertising materials and cover, Jun. 2001 (KS202).
User 's Manual of KVM-102UEC, Mini Compact, Two Ports USB KVM Switch.
"Belkin Omniview F1D104USB 4-Ports External KVM switch PS 2", eBay, "http://www.ebay.com/ctg/Belkin-Omniview-F1D104USB-4-Ports-External-KVM-switch-PS-2-/741232 . . . ", printed from Internet on Apr. 11, 2011.
"QVS the Connectivity Specialist", "PC Magazine", Mar. 2001 (CS-102U and CS-104U).
Product information about CS-102U and CS-104U from the ATEN's official website, printed on Jul. 1, 2009.
"PC World PC Application Magazine", the magazine cover and p. 80, Mar. 2001.
"Microcomputer Fax Magazine", the magazine cover and p. 270, Mar. 2001.
"Microcomputer Fax Magazine", the magazine cover and p. 120, Apr. 2001.
"Microcomputer Fax Magazine", the magazine cover and p. 284, Jun. 2001.
ATEN 1996 Product Guide entitled "ATEN Data Communication Knowledge Contribution Future Creation 1996".
ATEN 1997 Product Guide entitled "ATEN Connectivity Expert Data Communication Knowledge Contribution Future Creation '97".
ATEN 1998 Product Guide entitled "ATEN Connectivity Expert Data Communication Knowledge".
ATEN 1999 Product Guide entitled "ATEN Connectivity Expert Data Communication Knowledge Contribution Future Creation 99".
ATEN 2000 Product Guide entitled "ATEN Connectivity Expert 2000 Data Communication Knowledge Contribution Future Creation".
ATEN 2001 Product Guide entitled "ATEN Product Guide Master View".
ATEN 2001 Product Guide entitled "ATEN Enjoy your technology KVM, USB, FireWire & Data solutions Product Guide 2001".
ATEN 2002 Product Guide entitled "ATEN Master View KVM Switch Solutions Complete Control Product Guide 2002".
ATEN 2001 Product Guide entitled "ATEN Product Guide Data Communication Product".
ATEN User Manual for CS428 4 Console/8 Port KVM Switch.
ATEN User's Manual for Master View CS-12 2 port KVM Switch.
ATEN Packing List and User's Manual for Master View CS-142 2 port KVM Switch.
Startech SV211K KVM Switch Kit and Corresponding Instruction Guide.
Startech Press release for SV211K Rack Advisor from http://web.archive.org/web/20011212143020/www.startech.com/press_releases/sv211kpressrelease.htm [retrieved on Apr. 3, 2007].
ATEN 2001 Product Guide entitled "Product Guide Digital Connectivity".
ATEN User's Manual for Master View CS-142 2 port KVM Switch.
Defendants Belkin International, Inc. and Belkin, Inc.'s Supplemental Responses to ATEN International Co., Ltd. and ATEN Technology, Inc.'s Fifth Set of Interrogatories (No. 28), U.S. District Court, Central District of California, Southern Division, Case No. 8:09-CV-00843-(AG-MLGx); 102 pages.

* cited by examiner

KVMP SWITCH ALLOWING ASYNCHRONOUS AND SYNCHRONOUS SWITCHING FOR CONSOLE DEVICES AND PERIPHERAL DEVICES AMONG DIFFERENT COMPUTERS

This application is a continuation-in-part of U.S. application Ser. No. 11/727,333, filed Mar. 26, 2007, now allowed, which is herein incorporated by reference in its entirety. U.S. application Ser. No. 11/727,333 is a continuation of U.S. application Ser. No. 11/204,036, filed Aug. 16, 2005, now U.S. Pat. No. 7,340,556, which is in turn a continuation of U.S. application Ser. No. 10/065,375, filed Oct. 10, 2002, now U.S. Pat. No. 6,957,287, which claims priority from U.S. Provisional Application No. 60/338,071, filed Nov. 9, 2001.

BACKGROUND OF THE INVENTION

1. Field of the Invention

The present invention relates to a signal switch for sharing one or more than one video monitor, keyboard, mouse and peripheral device.

2. Description of the Related Art

A single-user or multi-user keyboard-video-mouse ("KVM") switch system is a signal switch that allows a single user or multiple users to share just a single keyboard, video device and mouse, or multiple sets of keyboards, video devices and mice.

A problem with current KVM switches is that if a USB peripheral, such as a printer, is connected to the switch, data flow is interrupted to that peripheral when the switch is changed.

Universal Serial Bus (USB) is a communications architecture that gives a personal computer (PC) the ability to interconnect a variety of devices using a simple cable. The USB is actually a two-wire serial communication link that runs at either 1.5 or 12 megabits per second (Mbps). USB protocols can configure devices at startup or when they are plugged in at run time. These devices are broken into various device classes. Each device class defines the common behavior and protocols for devices that serve similar functions.

The most current information concerning the USB standard is maintained at the following site on the World Wide Web: http://www.usb.org. Available at that source are the Universal Serial Bus (USB) Specification, the USB HID Usage Supplement, and the Device Class Definition for Human Interface Devices (HID). The HID class consists primarily of devices that are used by humans to control the operation of computer systems. Typical examples of HID class devices include: keyboards and pointing devices—for example, standard mouse devices, trackballs, and joysticks; front-panel controls—for example: knobs, switches, buttons, and sliders; controls that might be found on devices such as telephones, VCR remote controls, games or simulation devices—for example: data gloves, throttles, steering wheels, and rudder pedals; and devices that may not require human interaction but provide data in a similar format to HID class devices—for example, bar-code readers, thermometers, or voltmeters.

What is needed is a KVM switch that is also a peripheral sharing switch, which would allow all the computers connected to the switch to share any USB peripheral devices without interruption of data flow to that peripheral when the switch is changed, and which would switch the KVM channels and peripheral channels to a common computer or to different computers either asynchronously or synchronously.

SUMMARY OF THE INVENTION

Embodiments of the present invention meet this need by providing a KVM switch that is also a peripheral sharing switch, which allows all the computers connected to the switch to share any USB peripheral devices, and which can switch the KVM channels and peripheral channels to a common computer or to different computers either asynchronously or synchronously without interruption of data flow to that peripheral when the switch is changed. USB peripherals may be synchronously or asynchronously switched with the KVM channels.

An embodiment of the present invention, a USB KVMP, allows multiple USB keyboards and multiple USB mice communicating with a common computer at the same time. The USB KVMP provides multiple USB peripheral channels to users and those channels can be connected with all kinds of USB peripherals, such as a USB hub, USB printer, USB scanner, USB camera, etc.

Another embodiment of the present invention provides KVM switch which allows a keyboard and a mouse of a user console to separately control two different computers.

Yet another embodiment of the present invention provides a KVM switch system in which the KVM switch is connected to the computers via computer connection modules and connected to a user console and peripheral devices via a console connection module.

In one aspect, the present invention provides a keyboard-video-mouse (KVM) switch, comprising: a first computer port for connecting to a first computer; a second computer port for connecting to a second computer; a peripheral port for connecting to at least one peripheral device; a console port for connecting to a plurality of user console devices; a first communication link connecting the first computer port and the console port; a second communication link connecting the first computer port and the peripheral port; a third communication link connecting the second computer port and the console port; and a switching unit connected to the first computer port, the second computer port, the peripheral port and the console port for switching between the first and third communication links without interrupting the second communication link.

In another aspect, the present invention provides a keyboard-video-mouse (KVM) switch system, comprising: a first computer connection module for connecting to a first computer; a second computer connection module for connecting to a second computer; a console connection module, the console connection module including at least one console connector for connecting to at least one user console device and at least one peripheral connector for connecting to at least one peripheral device; a first communication link connecting the first computer connection module and the console connector of the console connection module; a second communication link connecting the first computer connection module and the peripheral connector of the console connection module; a third communication link connecting the second computer connection module and the console connector of the console connection module; and a switching module connected to the first computer connection module, the second computer connection module and the console connection module for switching between the first and third communication links without interrupting the second communication link.

In yet another aspect, the present invention provides a signal switch for sharing a set of console devices and one or more peripheral devices among any of a plurality of computer systems, comprising: a first channel for connecting the set of console devices comprising a first console device and a second console device to a first computer system selected from the plurality of computer systems; a second channel for connecting the first selected computer system to a peripheral device selected from the one or more peripheral devices; a third channel for connecting the first console device to the first selected computer system; a fourth channel for connecting the second console device to a second selected computer system; and a switching module for switching the set of console devices from the first channel to the third channel and the fourth channel without changing the second channel between the first selected computer system and the selected peripheral device.

It is to be understood that both the foregoing general description and the following detailed description are exemplary and explanatory and are intended to provide further explanation of the invention as claimed.

BRIEF DESCRIPTION OF THE DRAWINGS

These and other features, aspects, and advantages of the present invention will become better understood with reference to the following description, appended claims, and accompanying drawings, where:

DETAILED DESCRIPTION OF THE PREFERRED EMBODIMENTS

The present invention is directed to a signal switch for sharing one or more than one video monitor, keyboard, mouse and peripheral device. In one embodiment, the signal switch is the combination of a KVM (keyboard video mouse) switch and a peripheral sharing switch. KVM switches are well known in the art with reference to this disclosure. The signal switch according to embodiments of the present invention allows all computers connected to the switch to share all USB peripheral devices connected to the switch.

The signal switch can either asynchronously or synchronously switch KVM channels and peripheral channels to a common computer or different computer. In other words, the KVM channels and peripheral channels may be switched together (synchronously) or separately (asynchronously).

Embodiments of the present invention utilizes USB emulation programs to emulate the HID (Human Interface Devices) specification, thereby enabling a switch to communicate with the USB ports of PCs, and through USB host emulation programs, enable a switch to communicate with USB devices such as USB keyboards and USB mice, and a USB hub. In other words, the use of emulation makes a switch appear as a computer to peripheral devices, and enables the switch to communicate with USB devices or USB PCs at the same time.

Although an embodiment is described with reference to the current HID specification, it will be apparent to those skilled in the art with reference to this disclosure that the invention may be implemented with any specification for device interfacing.

Figure 1:
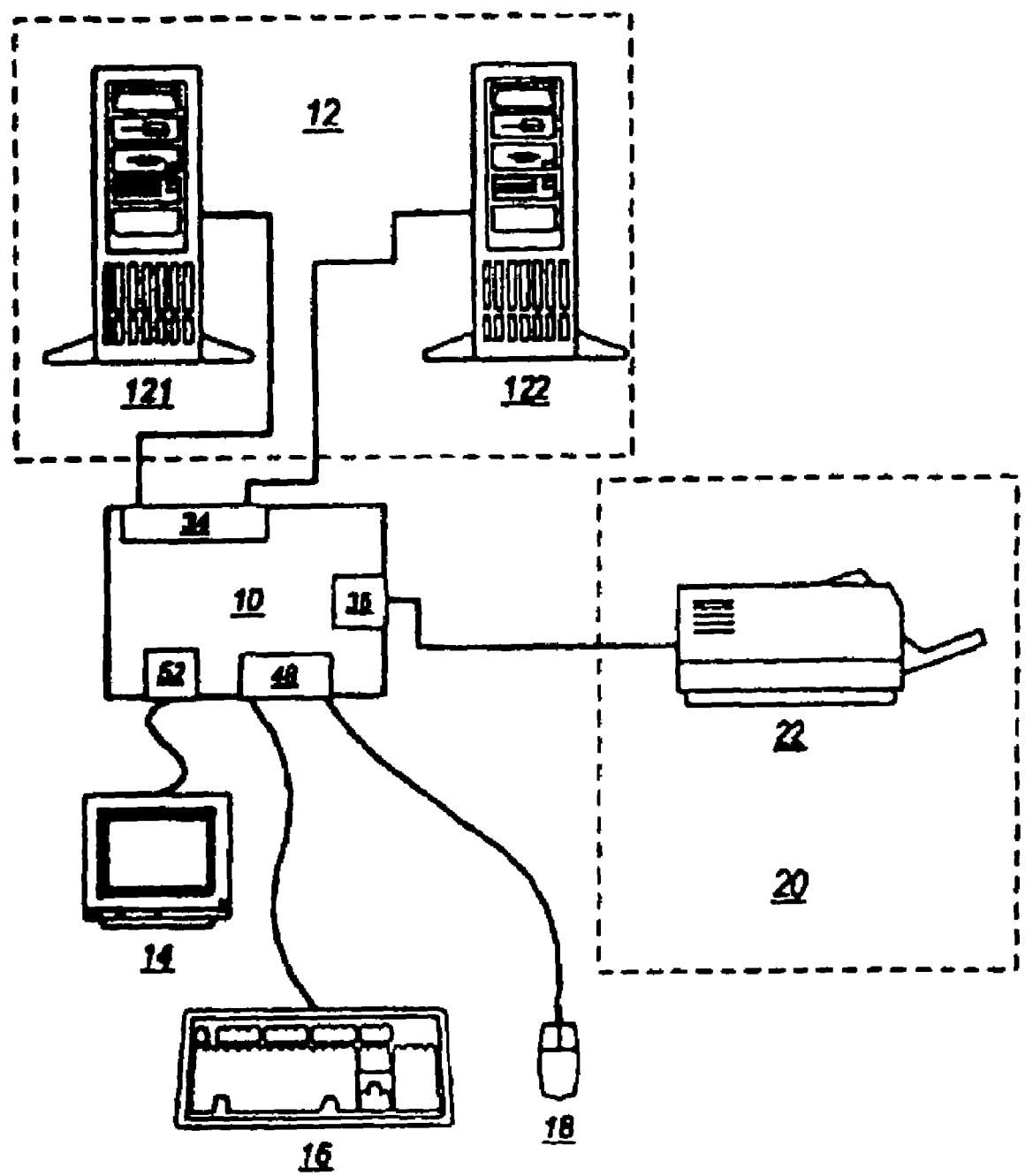
FIG. 1 is a system diagram of a system including a signal switch, computers, peripherals and a user console.

FIG. 1 illustrates one of the many ways in which the present invention may be used. In a simple configuration, a signal switch 10 according to the present invention permits a user to control a plurality of computer systems 12 (represented by first computer 121 and second computer 122), and USB compatible peripherals 20 (as shown by first printer 22) with a monitor 14, first keyboard 16, and first mouse 18. In this example, control of the peripheral first printer 22 can be maintained by computer 121 even while monitor 14, first keyboard 16 and first mouse 18 are controlling computer 122. This is because switch 10 can switch between a first channel (not shown) connecting monitor 14, first keyboard 16 and first mouse 18 to first computer 121 and a third channel (not shown) connecting monitor 14, first keyboard 16 and first mouse 18 to second computer 122, while maintaining a second channel (not shown) connecting first computer 121 to first printer 22 such that a first data flow between first computer 121 and first printer 22 is not interrupted. Moreover, when one of the first and third communication links is established, the other one of the first and third communication links is disconnected and the second communication link remains connected.

Figure 2:
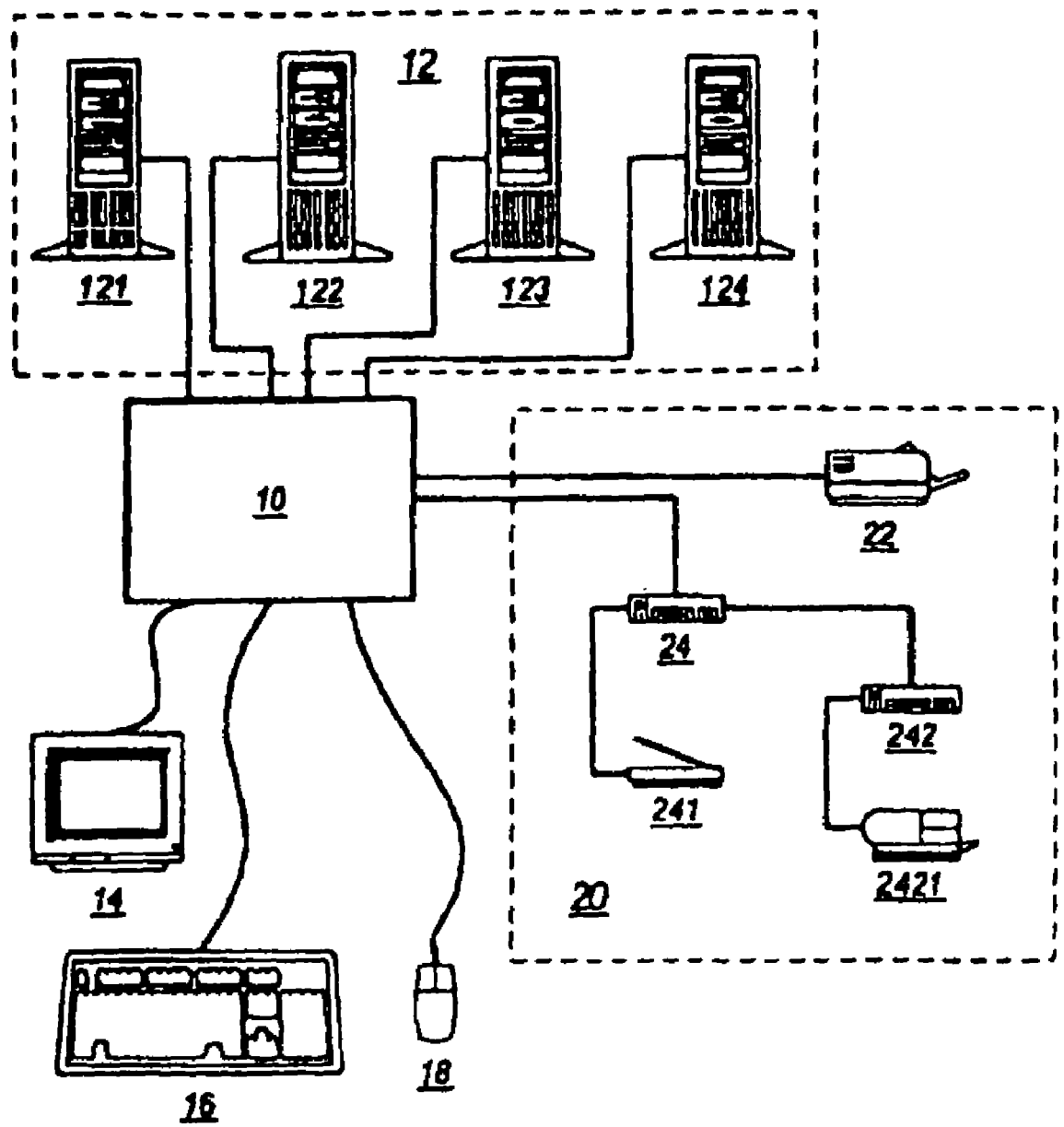
FIG. 2 is a system diagram of another system including a signal switch, computers, peripherals and a user console.

With reference to FIG. 2, a more robust use is shown permitting a user to control a larger number of computer systems 12 (represented by first computer 121, second computer 122, third computer 123, and fourth computer 124), and USB compatible peripherals 20 with monitor 14, first keyboard 16, and first mouse 18. Note that it is possible to have one or more than one USB hub 24 also connected to signal switch 10, which in turn can connect to one or more than one further peripherals such as scanner 241, or one or more than one downstream hub 242, which in turn may be connected to one or more than one peripherals such as second printer 2421. It thus can be seen that any desired tree of hubs/peripherals can be connected to signal switch 10 and thus controlled synchronously or asynchronously by the one or more than one computer systems 12 under the management of a single set of monitor 14, first keyboard 16, and first mouse 18.

Thus, for example, the first data flow between first computer 121 and first printer 22, a second data flow between first computer 121 and scanner 241, and a third data flow between first computer 121 and second printer 2421 all could be maintained without interruption while keyboard 16 and mouse 18, and optionally monitor 14, are switched among computer systems 12.

Peripheral devices that can be connected with the signal switch include but are not limited to a USB hub, printer, scanner and camera. Other examples of peripherals will be understood by one skilled in the art with reference to this disclosure.

Figure 3:
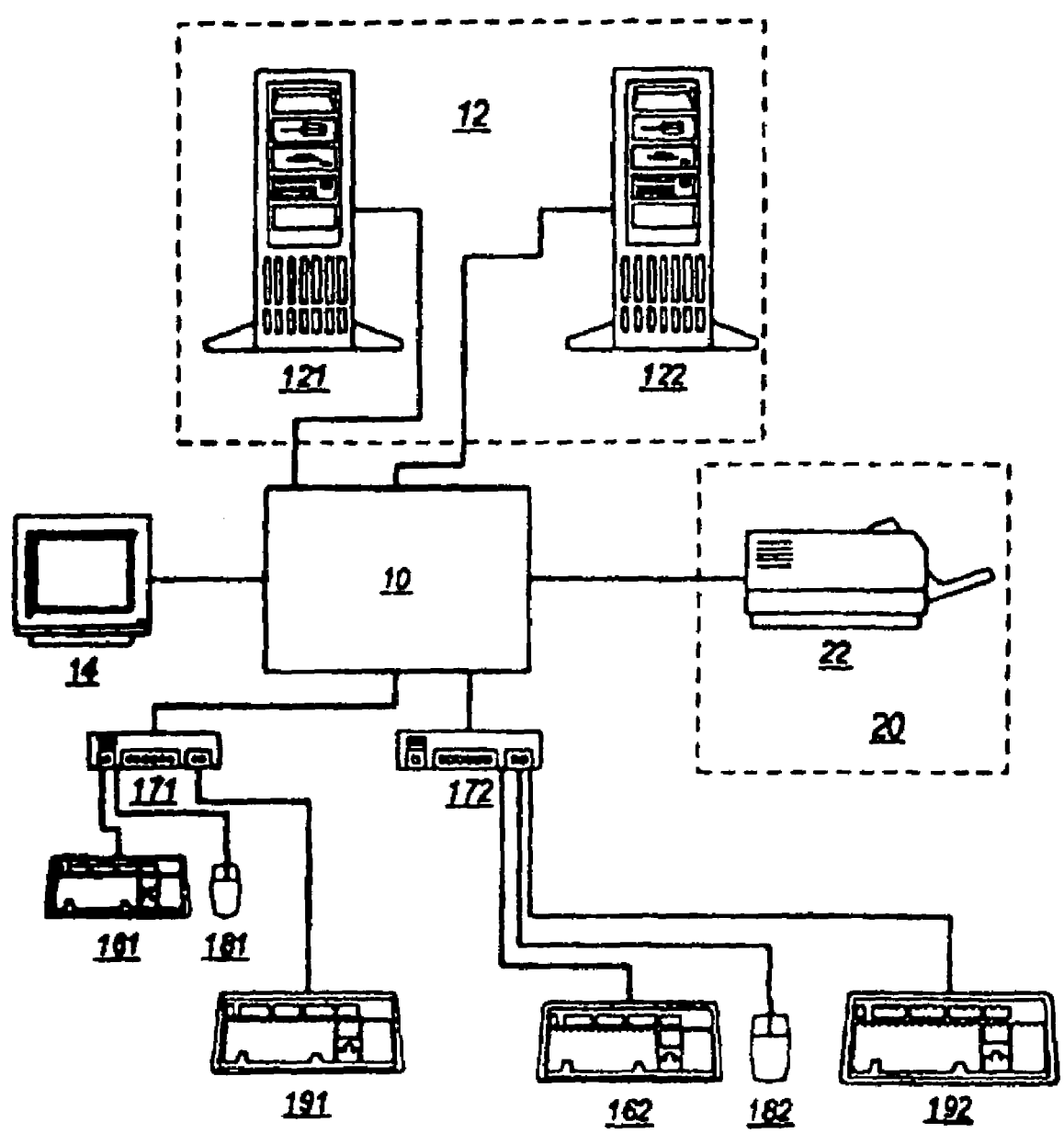
FIG. 3 is a system diagram of another system including a signal switch, computers, peripherals and user consoles.

With reference to FIG. 3, in a still further use of the signal switch, by way of example it is possible to connect multiple KM (keyboard and mouse) devices such as second keyboard 161, third keyboard 162, second mouse 181, second mouse 182, first composite KM device 191 and second composite KM device 192. Preferably, since a signal switch usually only has two USB console ports, one or more than one downstream hub may be connected, such as first downstream hub 171 and second downstream hub 172, to which may be connected one or more than one KM devices.

Figure 4:
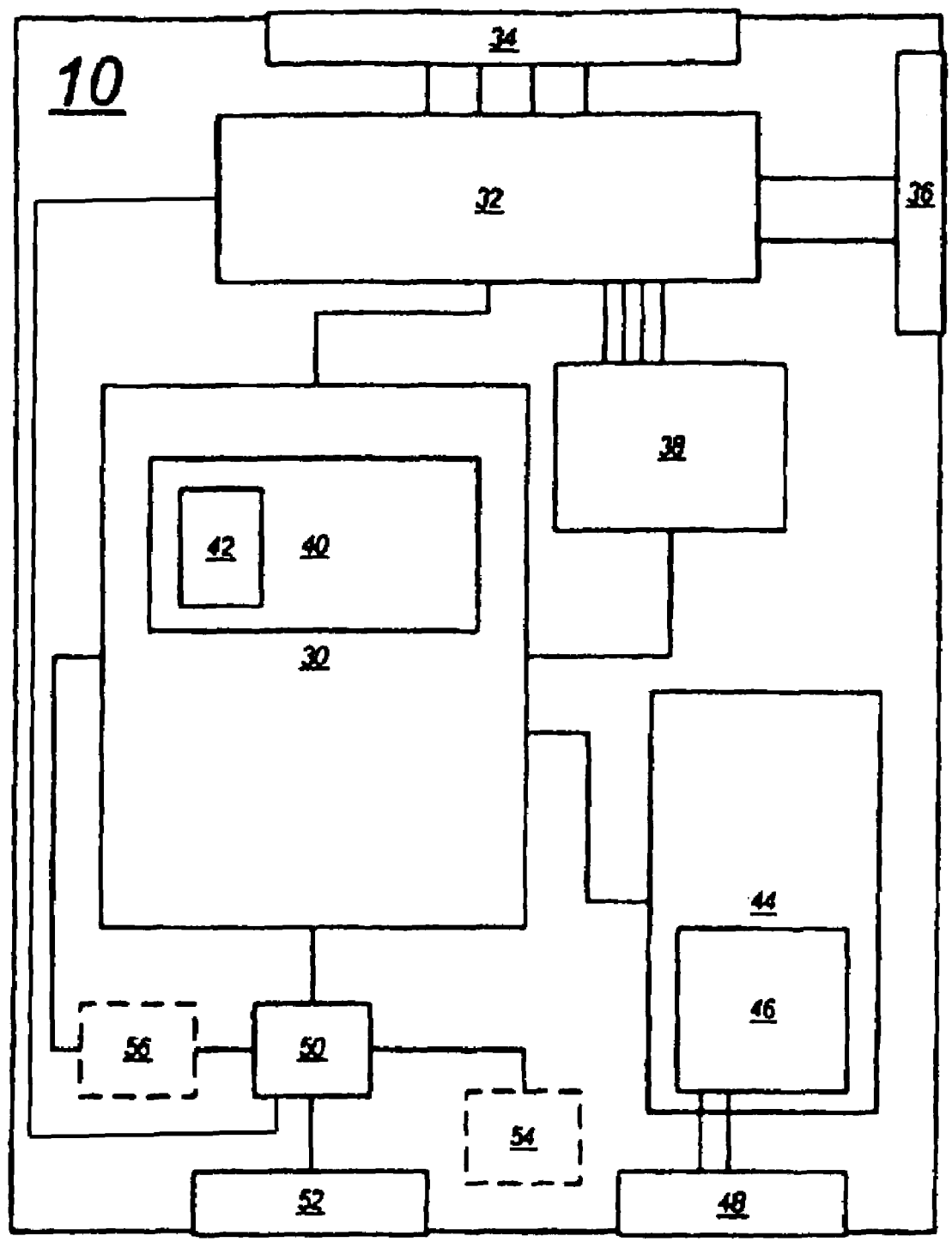
FIG. 4 is a block diagram of a signal switch according to one embodiment of the present invention.

With reference to FIG. 4, the signal switch 10 comprises a central processing unit ("CPU") 30 for managing the signal switch 10. A USB hub switch module 32 is connected to the CPU 30 and is configured to communicate with a plurality of computer systems 12 through first output ports 34. The USB hub switch module 32 is also configured to communicate with peripheral devices 20 through output ports 36. In FIG. 4, four connections are shown between first output ports 34 and the USB hub switch module 32, but this is by way of example only. The number of connections will equal the number of computer systems 12 for which the signal switch 10 is configured.

Likewise, in FIG. 4, two connections are shown between second output ports 36 and the USB hub switch module 32, but this is also by way of example only. The number of connections will equal the number of peripheral output ports for which the signal switch 10 is configured.

The USB hub switch module 32 is a bridge between peripheral devices 20 and computer systems 12 and allows the signal switch 10 to connect each of a plurality of computer systems to one or more than one peripheral device. Construction of a circuit suitable as a USB hub switch module is well known in the art with reference to this disclosure. In one preferred embodiment, the USB hub switch module includes 4 USB hubs and matrix analog switches which are controlled by CPU firmware. Texas Instruments® manufactures USB Hub chips that are suitable for this module, and the module can be constructed using Application Specific Integrated Circuit (ASIC) design methodology.

A USB device control module 38 for controlling signals is connected to the CPU 30 and the USB HUB switch module 32. The USB device control module 38 comprises USB device chips that are used to emulate the console devices, such as first keyboard 16 and first mouse 18, for the first output ports 34. In other words, by having a USB device chip emulate console devices attached to a first computer system, actual console devices may be switched to a second or different computer system, leaving any channels between the first computer system and peripherals connected, any data flow in such channels uninterrupted, and the first computer system still processing as if the actual console devices, now emulated, were still connected. These chips are controlled by CPU 30 firmware. One device chip is required for each computer system 12. Construction of a circuit suitable as a USB device control module is well known in the art with reference to this disclosure.

In addition, the USB device control module 38, under control of the CPU 30 firmware, may perform additional emulation so that the keyboard and mouse signals from the same user console can be switched to two different computers to control the two different computers. A user console refers to a set of user console devices typically including a monitor, a keyboard and a mouse such as those shown in FIG. 1 (monitor 14, keyboard 16, mouse 18). In a conventional a KVM switch system, the keyboard and mouse of one user console are always switched to the same computer. Using the emulation method described below, the keyboard 16 of the user console can be used to control one computer (for example, the first computer 12₁ in FIG. 1) and the mouse 18 of the user console can be used to control another computer (for example, the second computer 12₂ in FIG. 1).

Specifically, the user may instruct the signal switch 10 to switch the keyboard 16 and the mouse 18 to control two different computers. In such a situation, each of the two computers has only a keyboard or a mouse actually transmitting data to it, and the USB device chips in the USB device control module 38 emulate the null keyboard or mouse for the respective computers. For example, if the keyboard 16 is switched to the first computer 12₁ and the mouse 18 is switched to the second computer 12₂, the USB device chip for the first computer 12₁ emulates a null mouse, and the emulated null mouse signals along with the emulated keyboard signals which represent actually transmitted keyboard data from the keyboard 16 are sent to the first computer 12₁ via the USB hub switch module 32. In the mean time, the USB device chip for the second computer 12₂ emulates a null keyboard, and the emulated null keyboard signals along with the emulated mouse signals which represent actually transmitted mouse data from the mouse 18 are sent to the second computer 12₂ via the USB hub switch module 32. As a result, to both the first and second computers 12₁ and 12₂, it appears that both a keyboard and a mouse are present. This enables the keyboard and the mouse of one user console to separately control two computers.

When the keyboard 16 and the mouse 18 of the user console are separately controlling two computers, the video signals from the two computers may both be displayed on the monitor 14 using known technologies such as picture-in-picture (PIP) or other desktop sharing techniques. PIP may be implemented in a number of ways, such as by providing a video overlay circuit in the USB hub switch module 32 which is described in more detail later. Alternatively, the monitor may be switched to the same computer as the mouse, or switched to the same computer as the keyboard, as controlled by hot keys or buttons on the signal switch. As another alternative, two monitors may be provided, one being switched together with the mouse and the other being switched together with the keyboard.

In FIG. 4, four connections are shown between the USB device control module 38 and the USB hub switch module 32, but this is by way of example only. The number of connections will equal the number of computer systems 12 for which the signal switch 10 is configured. Each of the four connections may be a USB line that transfers both USB keyboard and USB mouse signals, or they may be two PS/2 lines for the keyboard and mouse signals, respectively. In one preferred embodiment, the USB device control module includes 4 USB device chips and the chips are also controlled by CPU firmware. Philips Semiconductors® makes chips suitable for use in this module, and the module may also be constructed using Application Specific Integrated Circuit (ASIC) design methodology.

Figure 5:
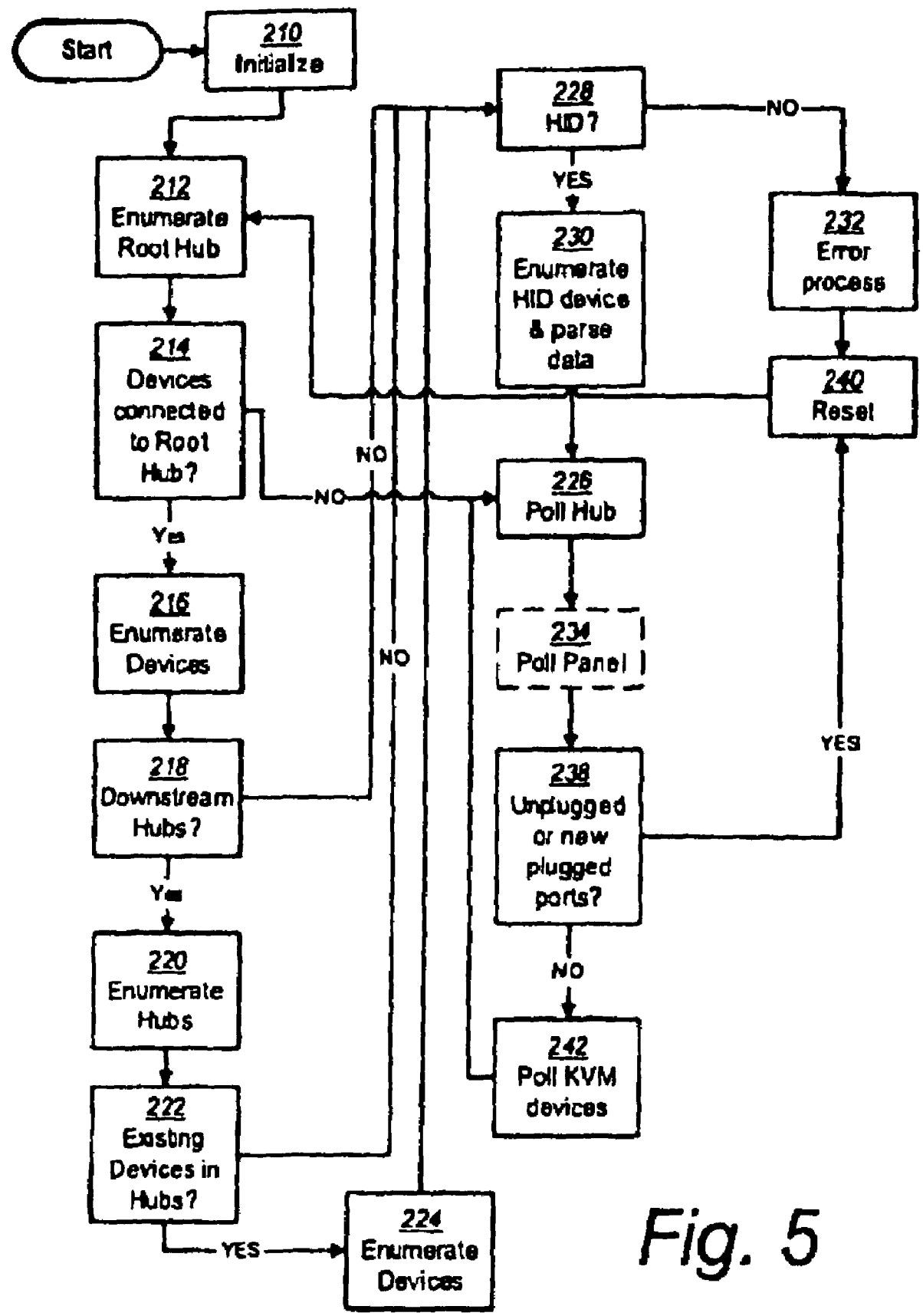
FIG. 5 is a function block diagram of process useable as a management control program for the signal switch of FIG. 4.

Referring to FIG. 4, the CPU 30 comprises a first memory 40 for storing a management program 42 for managing the operation of the signal switch 10. A flowchart of the function of a portion of management program 42 suitable for use in embodiments of the present invention is illustrated in FIG. 5, and described below.

A USB host control module 44 is configured to communicate with a plurality of console devices and is connected to the CPU 30. Construction of a circuit suitable as a USB host control module is well known in the art with reference to this disclosure. The USB host control module 44 itself comprises a root hub 46 for communicating with one or more than one console devices or downstream hubs, through third output ports 48. The root hub is a USB compatible hub, which is well known in the art with reference to this disclosure.

As shown in FIG. 3, one or more than one downstream hub may be connected to the signal switch 10, such as first downstream hub 17₁ and second downstream hub 17₂, communicating with root hub 46 through one of the third output ports 48. It is possible to daisy chain up to 127 devices by adding more downstream hubs.

Typically, third output ports 48 comprise two physical ports. Optionally, in a different embodiment, an Internal additional console USB hub (not shown) may be connected to the root hub 46 for increasing the number of third output ports 48 available for connecting console devices. The CPU 30 firmware has the ability to handle hub functions. Construction of firmware suitable to run the CPU according to the method disclosed herein is known in the art with reference to this disclosure.

An optional video/panel control device module 50 is connected to the CPU 30 for communicating with a variety of optional panel display devices 54 (shown in broken lines), such as light panels, LEDs, buttons, video controller switches, or other optional panel devices. If an on screen display ("OSD") function is provided, then an optional OSD control device module 56 (shown in broken lines) is connected to the CPU 30 and the video/panel control device module 50 for controlling and adjusting signals to an external monitor 14 through fourth output port 52. The video signals from a selected computer are outputted by the USB hub switch module 32 and applied to the video/panel control device module 50 (if it is present) or to the fourth output port 52. Construction of circuits suitable for use as a video/panel control device module or optional OSD control device module is known in the art with reference to this disclosure.

Figure 6:
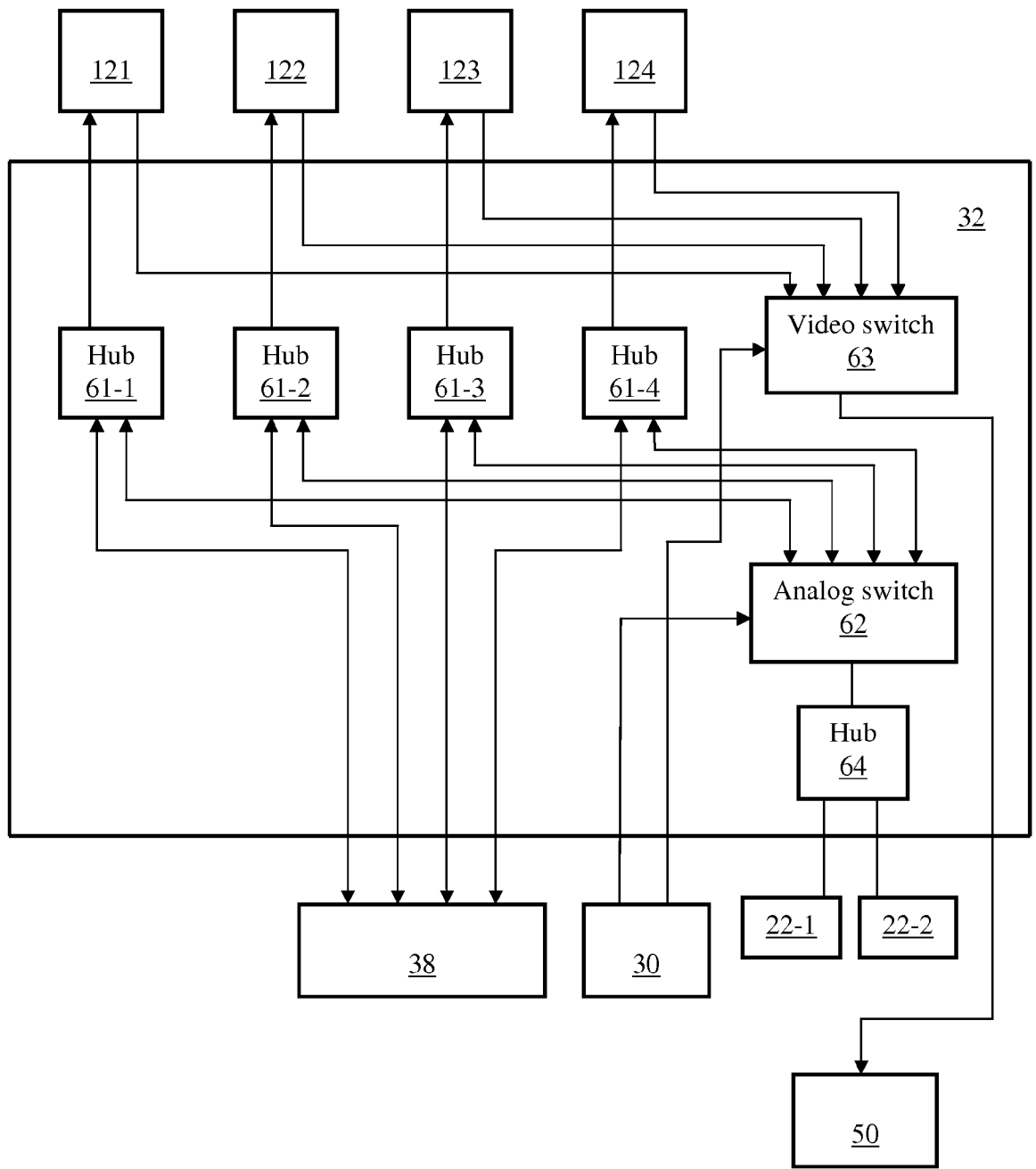
FIG. 6 is a block diagram illustrating the USB hub switch module of FIG. 4.

The structure of the USB hub switch module 32 and its connection to various other components are illustrated in more detail in FIG. 6. As shown in FIG. 6, the hub switch module 32 includes a plurality of USB hubs 61, here show as four USB hubs 61-1 to 61-4. Each hub 61 is connected to a computer 12, here shown as computers 121 to 124. The first output ports 34 disposed between the USB hub switch module 32 and the computers 12 in FIG. 4 is not shown in FIG. 6. Each USB hub 61 is also connected the USB device control module 38 (corresponding to the four lines between the components 32 and 38 shown in FIG. 4).

Each hub 61 is connected to an analog switch 62, which selectively connects one of the hubs 61 to another USB hub 64. The hub 64 is for connecting to a plurality of peripheral devices, shown here as peripheral devices 22-1 and 22-2. The second output port 36 disposed between the hub 64 and the peripheral devices 22 (see FIG. 4) is not shown in FIG. 6. The hub 64 is optional; if it is not present, the analog switch 62 connects one of the hubs 61 directly to a peripheral device 22.

The USB hub switch module 32 also includes a video switch 63 connected to the video signal port of each of the computers 121 to 124. The video switch 63 selectively outputs the video signals from one of the computers. In addition, the video switch 63 may include a video overlay circuit or other implementations to generate PIP video signals using video signals from two computers. PIP technologies are generally known in the art and a more detailed description is omitted here. The output video signal is applied to either the video/panel control device module 50 or the fourth output port 52 as described earlier. The CPU 30 is connected to and controls the analog switch 62 and the video switch 63.

With reference to FIG. 5, the process of a portion of a management program 42 suitable for use in embodiments of the present invention may proceed as follows. In step 210 the signal switch 10 is initialized. In step 212, a root hub 46 is enumerated and any root hub message from the root hub 46 is saved. In step 214 it is determined whether any device is connected to the root hub 46. If a device is determined to be connected to the root hub 46, program process passes to step 216, else the process passes to step 226.

In step 216, each device determined to be connected to the root hub 46 is enumerated, and a device message from the USB device determined to be connected to the root hub 46 is parsed and saved in a suitable memory.

Next, in step 218, it is determined whether any downstream hub is connected to the root hub 46. If no downstream hub is determined to be connected to the root hub 46, the process proceeds to step 228. If a downstream hub is detected, the process passes to step 220. In step 220 each downstream hub determined to be connected to the root hub 46 is enumerated and a downstream port status of the hub is received. The process then proceeds to step 222.

In step 222, it is determined whether any device is existing in a port of the downstream hub. If no device is determined to be existing in a port of the downstream hub, the process proceeds to step 228. If, in step 222, a device is determined to be existing in a port of a downstream hub, the process proceeds to step 224 where each such device is enumerated and a connecting device message is parsed and saved in a suitable memory. The process then proceeds to step 228.

In step 228, it is determined whether the connected device is a HID keyboard or mouse or other HID compliant device. As will be evident to those skilled in the art with reference to this disclosure, this step could test for compliance with any desired industry standard or device class. If the connected device is not such a device, the process proceeds to step 232 which is an error process which results in resetting a HOST control RAM in step 240. If the connected device is determined to be complaint, then in the next step 230, each such connected device is enumerated and its report data is parsed. The reason for the compliance test is that the switch has been constructed to emulate certain console devices which comply with an industry standard device class.

Control then passes to step 226 where the HUB switch module 32 is polled. In optional step 234 any panel or LED circuit is polled. In step 238 it is determined whether any downstream port is unplugged or plugged. If the downstream port is unplugged or plugged the process proceeds to step 240 where the HOST control RAM is reset. After resetting the HOST control RAM in step 240 the process returns to step 212. Else, the process proceeds to step 242 where the KVM devices are polled and the process returns to step 234.

Figure 7:
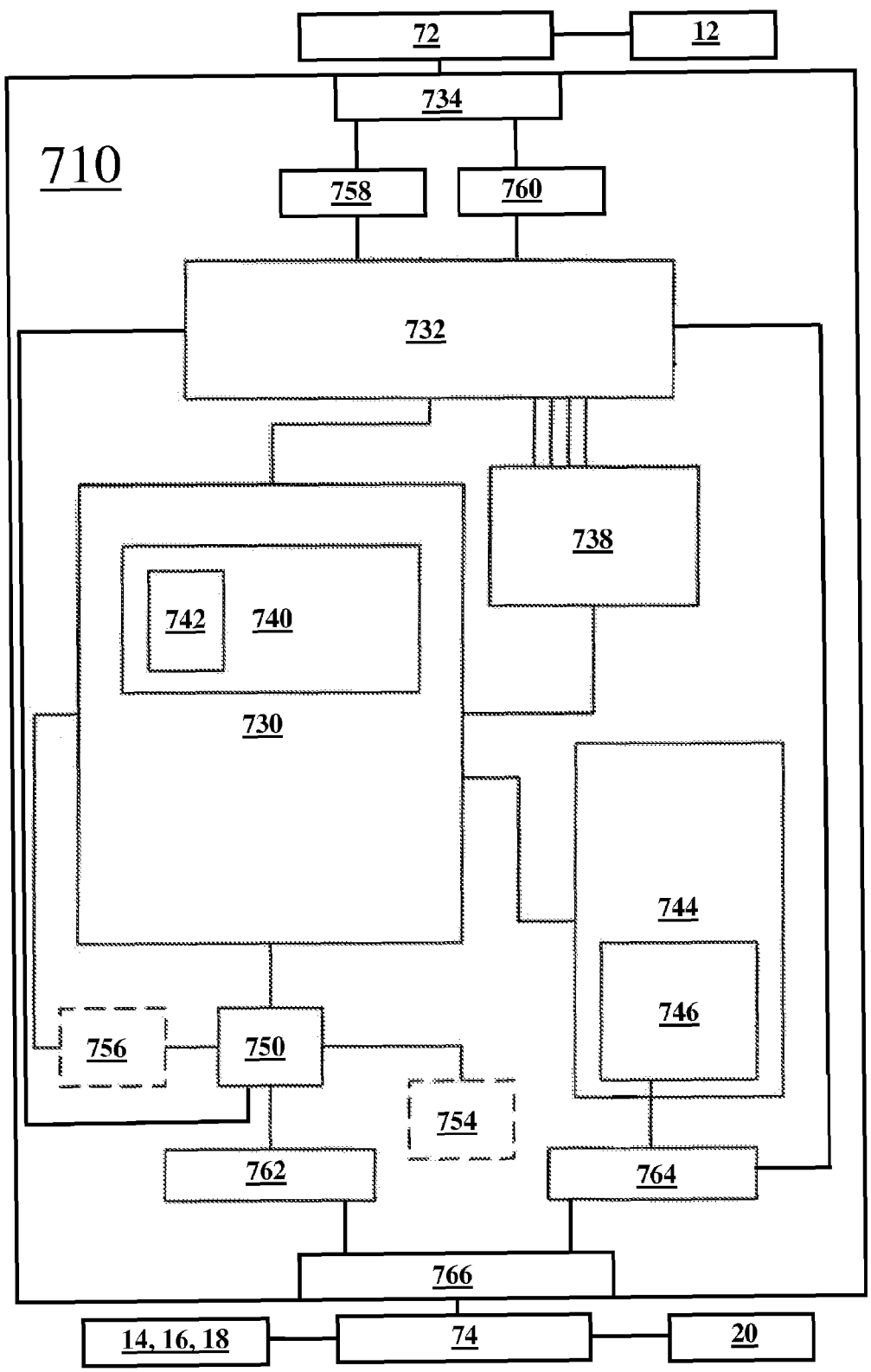
FIG. 7 is a block diagram of a signal switch according to another embodiment of the present invention, also showing a computer connection module and a console connection module connected to the signal switch.

FIG. 7 illustrates a signal switch 710 according to another embodiment of the present invention, which is used in combination with a plurality of computer connection modules 72 (only one is shown) and one or more console connection module 74 (only one is shown). Each computer is connected to the signal switch 710 via one computer connection module 72. Each user console is connected to the signal switch 710 via one console connection module 74, which can also connect one or more peripheral devices to the signal switch 710. In FIG. 7, some components are the same as or similar to the corresponding components in FIG. 4, and similar reference numbers as in FIG. 4 are used for such components. In particular, the structures and functions of the USB hub switch module 732, the USB device control module 738, the CPU 730, the optional video/panel control device module 750, the optional panel display devices 754, the optional OSD control device module 756, and the USB host control module 744 are the same or similar to the corresponding components 32, 38, 30, 50, 54, 56 and 44 of the signal switch 10 shown in FIG. 4.

In the signal switch 710 of FIG. 7, the second output ports 36 in the embodiment of FIG. 4 is not present; rather, the data signals for the peripheral devices 20 outputted by the USB hub switch module 732 are inputted to a digital signal decoder/encoder 764 as described later.

The computer connection module 72 is a device that connects to first ports 734 of the signal switch 710 by a long distance cable such as a Category 5 (Cat 5) cable, and connects to a computer system 12 by a number of short (typically built-in) cables such as USB cable, PS/2 cables, VGA cable, etc. (not shown in FIG. 7). In one embodiment, the computer connection module includes a body and three cables connected to the body, wherein each of the three cables includes a plug, the plugs being a VGA interface, a PS/2 interface, and a PS/2 interface, respectively, for connecting to the computer. In another embodiment, the computer connection module includes a body and two cables connected to the body, wherein each of the two cables includes a plug, the plugs being a VGA interface and a USB interface, respectively, for connecting to the computer. Only one first port 734 is shown in FIG. 7 to avoid overcrowding, but it should be understood that there are multiple first ports 734 for connecting to multiple computers. The signal switch 710 includes an analog signal decoder 758, connected to the first ports 734, which decodes the video signals received from the computer 12 via the computer connection module 72 and transmits the video signals to the USB hub switch module 32. The signal switch 710 also includes a digital signal decoder/encoder 760, connected to the first ports 734, which encodes the keyboard and mouse signals received from the USB hub switch module 732 and transmits the keyboard and mouse signals to the computers 12 via the computer connection module 72, and decodes data signals (e.g. data intended for a peripheral device) received from the computer 12 via the computer connection module 72 and transmits them to the USB hub switch module 732. Different pairs of wires within the Cat 5 cable are used to carry the video signals and the keyboard, mouse and data signals between the signal switch 710 and the computer connector module 72. For example, three of the four pairs of wires may be used to carry the RGB video signals and the fourth pair of wires may be used to carry the keyboard, mouse, and data signals.

The console connection module 74 is a device that connects to second ports 766 of the signal switch 710 by a long distance cable such as a Cat 5 cable, and connects to the console devices such as a keyboard 16, a mouse 18 and a monitor 14, as well as peripheral devices 20, by a number of short (typically built-in) cables such as USB cable, PS/2 cables, VGA cable, etc. (not shown in FIG. 7). Compare to the signal switch 10 of FIG. 4, the second ports 766 replaces the output ports 48 and 52 in FIG. 4. Only one second port 766 is shown in FIG. 7 to avoid overcrowding, but it should be understood that there may be multiple second ports 766 for connecting to multiple user consoles. The signal switch 710 includes an analog signal encoder 762, connected to the second ports 766, which encodes the video signals received from the video control device module 750 and transmits the video signals to the monitor 14 via the console connection module 74. The signal switch 710 also includes a digital signal encoder/decoder 764, connected to the second ports 766, which decodes the keyboard and mouse signals received from the console devices (keyboard 16 and mouse 18) via the console connection module 74 and transmits them to the USB host control module 744. The digital signal encoder/decoder 764 also encodes the data signals received from the USB hub switch module 732 and transmit them to the peripheral devices 20 via the console connection module 74, or, receives the data signals from the peripheral devices 20 via the console connection module 74 and decodes them then transmits them to the USB hub switch module 732. Different pairs of wires within the Cat 5 cable are used to carry the video signals and the keyboard, mouse and data signals between the signal switch 710 and the console connector module 74. For example, three of the four pairs of wires may be used to carry the RGB video signals and the fourth pair of wires may be used to carry the keyboard, mouse, and data signals.

In both the signals switches of FIGS. 4 and 7, the firmware controls the USB console devices and PC console device emulations. It is not necessary to control the USB peripherals, since the signal switch generates a path or channel between the USB peripherals and the linked PCs which is undisturbed by switching the channels between the complaint KM devices and the PCs.

Those skilled in the art with reference to this disclosure will be able to construct a USB emulation program suitable for use in embodiments of the present invention by following the human interface device (HID) specification. The HID specification defines a quasi-language for the HID-compliant USB device to tell the host how to interpret the data that the host receives. This quasi-language is flexible and permits many ways to describe the same piece of functionality. The signal switch will be useable with other industry standard specifications that define a procedure to tell a host how to interpret the data that the host receives from a standards-compliant device.

Currently, a Device Class Definition for Human Interface Devices (HID) Firmware Specification—Jun. 27, 2001, Version 1.11, is available at http://www.usb.org/developers/data/devclass/HID1.sub.--11.pdf and is incorporated herein. The most current version of the specification and other HID related information is maintained at http://www.usb.org/developers/hidpage.html.

Using a bus analyzer, such as one available currently from Computer Access Technology Corp. it is possible to read the USB bus and analyze the data packets coming from a keyboard and a mouse. The HID specification provides interpretation of the packet meaning. By providing that all the console devices be complaint with the HID specification, or some future standard specification, it is only necessary to emulate such HID or standards-compliant devices.

In a preferred embodiment the whole system programs, which include USB Hub switch control, USB device chip control (device emulation) and console device emulation (Host emulation) are all built in a CPU chip (Flash ROM or PROM). One skilled art with reference to this disclosure and following the referenced specifications will be able to write a USB emulation program suitable to make a switch appear as a PC to peripheral devices, and enable the switch to communicate with USB devices or USB PCs at the same time.

The term "channel", as used in the phrase "KVM channels" and "peripheral channels", refers to the hardware structure and logic path for data and electrical signals. Any suitable hardware structure or combination thereof can be used to implement a channel, such as communication lines, encoders/decoders, crosspoint switches, device controllers, ASICs, FPGAs, etc. Another term that can be used to refer to the same concept is "communication link".

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. It should be appreciated that the present invention should not be construed as limited by such embodiments, but rather construed according to the below claims.

What is claimed is:

1. A keyboard-video-mouse (KVM) switch, comprising:
   a first computer port for connecting to a first computer;
   a second computer port for connecting to a second computer;
   a peripheral port for connecting to at least one peripheral device;
   a console port for connecting to a plurality of user console devices;
   a first communication link connecting the first computer port and the console port;
   a second communication link connecting the first computer port and the peripheral port;
   a third communication link connecting the second computer port and the console port; and
   a switching unit connected to the first computer port, the second computer port, the peripheral port and the console port for switching between the first and third communication links without interrupting the second communication link.

2. The KVM switch of claim 1, wherein when one of the first and third communication links is established, the other one of the first and third communication links is disconnected and the second communication link remains connected.

3. The KVM switch of claim 1, wherein the peripheral port is a USB interface.

4. A keyboard-video-mouse (KVM) switch system, comprising:
   a first computer connection module for connecting to a first computer;
   a second computer connection module for connecting to a second computer;
   a console connection module, the console connection module including at least one console connector for connecting to at least one user console device and at least one peripheral connector for connecting to at least one peripheral device;
   a first communication link connecting the first computer connection module and the console connector of the console connection module;
   a second communication link connecting the first computer connection module and the peripheral connector of the console connection module;
   a third communication link connecting the second computer connection module and the console connector of the console connection module; and
   a switching module connected to the first computer connection module, the second computer connection module and the console connection module for switching between the first and third communication links without interrupting the second communication link.

5. The KVM switch system of claim 4, wherein each of the first computer connection module and the second computer connection module includes a body and three cables connected to the body.

6. The KVM switch system of claim 4, wherein the switching module connects to each of the first computer connection module, the second computer connection module, and the console connection module via a Category 5 cable.

7. The KVM switch system of claim 4, wherein each of the first computer connection module and the second computer connection module includes a body and two cables connected to the body.

8. The KVM switch system of claim 4, wherein the switching module comprises:
   a CPU comprising a first memory for storing a management program for managing the switching module;
   a hub switch module connected to the CPU and configured to communicate with the first computer and second computer, and the user peripheral device, such that a signal transmitted from the hub switch module to the peripheral device emulates signals originating from one of the computers;
   a device control module connected to the CPU and the hub switch module for emulating the user console device according to a standard;
   a host control module connected to the CPU and configured to communicate with the user console device; and
   a video control device module connected to the CPU and configured to communicate with a video monitor device.

9. The KVM switch system of claim 4, wherein the peripheral connector is a USB interface.

10. The KVM switch system of claim 5, wherein each of the three cables includes a plug, the plugs being a VGA interface, a PS/2 interface, and a PS/2 interface, respectively, for connecting to the first or second computer.

11. The KVM switch system of claim 8, wherein each of the two cables includes a plug, the plugs being a VGA interface and a USB interface, respectively, for connecting to the first or second computer.

12. The KVM switch system of claim 8, wherein the switching module further comprises analog signal decoders, which decode the video signals received from the first computer and the second computer via the first computer connection module and second computer connection module and transmit the decoded video signals to the USB hub switch module.

13. The KVM switch system of claim 8, wherein the switching module further comprises digital signal decoders/encoders, which encode keyboard and mouse signals received from the USB hub switch module and transmit the keyboard and mouse signals to the first computer and second computer via the first computer connection module and second computer connection module, and decode data signals received from the first computer and second computer via the first computer connection module and second computer connection module and transmit them to the USB hub switch module.

14. The KVM switch system of claim 8, wherein the switching module further comprises an analog signal encoder, which encodes the video signals received from the video control device module and transmits the video signals to a monitor via the console connection module.

15. The KVM switch system of claim 8, wherein the switching module further comprises a digital signal encoder/decoder, which decodes keyboard and mouse signals received from the user console device via the console connection module and transmits them to the USB host control module, wherein the digital signal encoder/decoder encodes the data signals received from the USB hub switch module and transmits them to the peripheral devices via the console connection module, and wherein the digital signal encoder/decoder receives data signals from the peripheral devices via the console connection module and decodes them then transmits them to the USB hub switch module.

16. A signal switch for sharing a set of console devices and one or more peripheral devices among any of a plurality of computer systems, comprising:
   a first channel for connecting the set of console devices comprising a first console device and a second console device to a first computer system selected from the plurality of computer systems;

a second channel for connecting the first selected computer system to a peripheral device selected from the one or more peripheral devices;

a third channel for connecting the first console device to the first selected computer system;

a fourth channel for connecting the second console device to a second selected computer system; and a switching module for switching the set of console devices from the first channel to the third channel and the fourth channel without changing the second channel between the first selected computer system and the selected peripheral device.

17. The signal switch of claim 16, wherein one of the first and second console devices is a keyboard and the other one of the first and second console devices is a mouse.

18. The signal switch of claim 16, wherein the set of console devices further comprise a third console device.

19. The signal switch of claim 16, wherein the switching module switches the set of console devices from the third and fourth channels to first channel without changing the second channel between the first selected computer system and the selected peripheral device.

20. The signal switch of claim 16, wherein the second channel is a USB interface.

21. The signal switch of claim 18, wherein the third console device is a monitor.

22. The signal switch of claim 18, wherein the third channel allows the first console device and the third console device to connect to the first selected computer system.

23. The signal switch of claim 18, wherein the fourth channel allows the second console device and the third console device to connect to the second selected computer system.

* * * * *